(12) United States Patent
Uchida et al.

(10) Patent No.: US 8,682,088 B2
(45) Date of Patent: Mar. 25, 2014

(54) IMAGE PROCESSING APPARATUS AND IMAGE PROCESSING METHOD

(75) Inventors: Masaki Uchida, Chiba (JP); Kazunori Kamio, Kanagawa (JP)

(73) Assignee: Sony Corporation, Tokyo (JP)

( * ) Notice: Subject to any disclaimer, the term of this patent is extended or adjusted under 35 U.S.C. 154(b) by 24 days.

(21) Appl. No.: 13/483,430

(22) Filed: May 30, 2012

(65) Prior Publication Data

US 2012/0308146 A1 Dec. 6, 2012

(30) Foreign Application Priority Data

Jun. 6, 2011 (JP) ................................. 2011-126040

(51) Int. Cl.
*G06K 9/36* (2006.01)

(52) U.S. Cl.
USPC .......................................................... 382/232

(58) Field of Classification Search
USPC ........................... 382/232, 239, 254, 274, 275
See application file for complete search history.

(56) References Cited

U.S. PATENT DOCUMENTS

| 5,787,203 | A | * | 7/1998 | Lee et al. | 382/232 |
| 5,799,111 | A | * | 8/1998 | Guissin | 382/254 |
| 2003/0138164 | A1 | | 7/2003 | Satou et al. | |
| 2007/0257997 | A1 | | 11/2007 | Tanizoe | |

FOREIGN PATENT DOCUMENTS

| EP | 1 605 689 A1 | 12/2005 |
| EP | 1 865 711 A2 | 12/2007 |
| JP | 3-266565 | 11/1991 |

OTHER PUBLICATIONS

The Extended European Search Report issued Jul. 2, 2013, in Application No. / Patent No. 12168719.8-1908 / 2533515.
James C. Brailean, et al., "Noise Reduction Filters for Dynamic Image Sequences: A Review", Proceedings of the IEEE, vol. 83, No. 9, XP000526001, Sep. 1, 1995, pp. 1272-1291.

* cited by examiner

*Primary Examiner* — Yon Couso
(74) *Attorney, Agent, or Firm* — Oblon, Spivak, McClelland, Maier & Neustadt, L.L.P.

(57) ABSTRACT

An image processing apparatus includes: a noise reduction processing amount calculator configured to calculate a noise reduction processing amount based on input image data and previous-frame output image data subjected to data compression/decompression processing; a feedback ratio correction unit configured, based on compression error information, to output the uncorrected noise reduction processing amount calculated by the noise reduction processing amount calculator with regard to a pixel having a noise reduction feedback ratio less than 100%, and to correct the noise reduction processing amount with regard to a pixel having a noise reduction feedback ratio of 100% or more such that the feedback ratio is less than 100%, and to output the corrected noise reduction processing amount; and an adder configured to add the noise reduction processing amount output from the feedback ratio correction unit to the input image data to thereby obtain output image data.

6 Claims, 7 Drawing Sheets

IMAGE PROCESSING APPARATUS AND IMAGE PROCESSING METHOD

BACKGROUND

The present disclosure relates to an image processing apparatus and an image processing method. Specifically, the present disclosure relates to an image processing apparatus and an image processing method performing cyclic noise reduction processing by using previous-frame output image data subjected to data compression/decompression processing.

Recently, in image processing LSIs (Large Scale Integration) and the like, complex high-image-quality functions and the like increase memory bandwidths greatly. As a countermeasure, in many cases, communication volumes with external memories are reduced by compressing image data.

FIG. 4 shows an example of an image processing apparatus 200 performing cyclic noise reduction processing. The image processing apparatus 200 includes a noise reduction unit 210, an encoder 220, a frame memory 230, and a decoder 240. In the image processing apparatus 200, image data temporarily stored in the frame memory 230 is handled as compressed image data, and thus data communication volume between the noise reduction unit 210 side and the frame memory 230 is reduced.

Output image data output from the noise reduction unit 210 is supplied to the encoder 220. The encoder 220 performs invertible data compression processing on the output image data by using a predetermined compression algorithm to thereby obtain compressed image data. The compressed image data is temporarily stored in the frame memory 230 constituting delay means.

Previous-frame compressed image data is read from the frame memory 230 and supplied to the decoder 240. The decoder 240 performs data decompression processing on the compressed image data to thereby obtain previous-frame output image data. In addition to the previous-frame output image data, input image data is supplied to the noise reduction unit 210.

The noise reduction unit 210 calculates a noise reduction processing amount (NR processing amount) as a feedback value based on the input image data and the previous-frame output image data. Further, the noise reduction unit 210 adds the NR processing amount to the input image data to thereby obtain output image data.

In the configuration of the image processing apparatus 200 shown in FIG. 4, the image data compression is performed on a frame basis, which is a spatial-directional compression. Meanwhile, the noise reduction is time-directional processing. The processing dimensions are different from each other. Because of this, a noise reduction feedback ratio (NR feedback ratio) is 100%, and previous-frame output image data may be output continuously.

For example, a noise reduction of adding differential data (frame differential value) between previous-frame output image data (image data of previous frame) and input image data (image data of current frame) to input image data at a feedback ratio of 50% is assumed.

In the noise reduction, as shown in (a) in FIG. 5, it is assumed that an input image data level of a certain pixel is changed from "8" in the Nth frame to "0" in the (N+1)th frame. In this case, as shown in (d) in FIG. 5, output image data converges to the input image data level in the (N+4)th frame. Note that (b) in FIG. 5 shows previous-frame output image data, which is one-frame-delayed output image data shown in (d) in FIG. 5. Further, (c) in FIG. 5 shows a frame differential value, which is a value obtained by subtracting the input image data shown in (a) in FIG. 5 from the previous-frame output image data shown in (b) in FIG. 5.

It is assumed that the following compression function is combined with the noise reduction of the image processing apparatus 200 of FIG. 4. In the compression function, 8-bit image data is compressed into 5-bit image data by rounding off the 3rd bit from the LSB (Least Significant Bit) side. In this case, as shown in (d) in FIG. 6, when the output image data level reaches 4, the noise reduction processing is buried in compression errors, and the output image data may not converge on the input image data permanently. This is the 100% NR feedback ratio state.

Note that, similar to (a) in FIG. 5, (a) in FIG. 6 shows an input image data level of a certain pixel, and the input image data level is changed from "8" in the Nth frame to "0" in the (N+1)th frame. (b) in FIG. 6 shows previous-frame output image data subjected to data compression/decompression processing. Since the previous-frame output image data is subjected to data compression/decompression processing, it is different from the previous-frame output image data, which is merely one-frame-delayed output image data, shown in (b) in FIG. 5.

That is, in the above-mentioned compression algorithm, image data is compressed into 5-bit image data by rounding off the 3rd bit from the LSB side. Therefore, the output image data level "4" may not be expressed in compressed image data, and "8" is thus written in the frame memory 230. As a result, the previous-frame output image data shown in (b) in FIG. 6 has a level "8" in the (N+2)th frame and thereafter.

Further, (c) in FIG. 6 shows a frame differential value, which is a value obtained by subtracting the input image data shown in (a) in FIG. 6 from the previous-frame output image data shown in (b) in FIG. 6. The previous-frame output image data shown in (b) in FIG. 6 is subjected to data compression/decompression processing, and thus has a level "8" in the (N+2)th frame and thereafter, as described above. As a result, the frame differential value is "8" in the (N+1)th frame and thereafter. Therefore, as described above, when the output image data level reaches 4, the noise reduction processing is buried in compression errors. As a result, the output image data may not converge on the input image data permanently. The NR feedback ratio is 100%, that is, the output image data is held as it is.

Because of the above-mentioned state where the NR feedback ratio is 100%, an output image includes a faint afterimage of the previous frame. FIG. 7 shows examples of images of input image data (input images) and images of output image data (output images). In the examples, rectangular inserted image portions IM are image portions having high loss information amounts due to compression. In the image portions IM, because of data compression/decompression processing, the NR feedback ratio is 100%. As a result, in the output images, the image portion IM includes a faint afterimage of the previous frame image.

For example, Japanese Patent Application Laid-open H03-266565 (hereinafter, referred to as Patent Document 1) describes that, in a case of a scene change and the like in which a differential between a present image and a previous image is large, in order to shorten a display time of an afterimage of a previous image, a NR feedback ratio is temporarily reduced, and an output image is converged on an input image at high speed.

As described above, in order to avoid the state where the NR feedback ratio is 100% and an output image includes an afterimage, a NR feedback ratio may be reduced periodically. In this case, the noise reduction is ineffective periodically. As a result, a noise repeatedly goes off, then comes out, then goes off, and then comes out. In an image including a noise, the noise reduction effect is reduced.

It is desirable to preferably avoid the state where a NR feedback ratio is 100% and an output image includes an afterimage, in a case of performing cyclic NR (noise reduction) processing by using previous-frame output image data subjected to data compression/decompression processing.

SUMMARY

According to a concept of the present technology, there is provided an image processing apparatus, including:

a noise reduction processing amount calculator configured to calculate a noise reduction processing amount based on input image data and previous-frame output image data subjected to data compression/decompression processing;

a feedback ratio correction unit configured, based on compression error information,

- to output the uncorrected noise reduction processing amount calculated by the noise reduction processing amount calculator with regard to a pixel having a noise reduction feedback ratio less than 100%, and
- to correct the noise reduction processing amount with regard to a pixel having a noise reduction feedback ratio of 100% or more such that the feedback ratio is less than 100%, and to output the corrected noise reduction processing amount; and an adder configured to add the noise reduction processing amount output from the feedback ratio correction unit to the input image data to thereby obtain output image data.

In the present technology, the noise reduction processing amount calculator calculates a noise reduction processing amount based on input image data and previous-frame output image data subjected to data compression/decompression processing. The present technology is independent of a noise reduction algorithm. That is, in the present technology, the noise reduction processing amount calculator may calculate the noise reduction processing amount based on the input image data and the previous-frame output image data by using any algorithm.

Further, the present technology is independent of a data compression algorithm. That is, in the present technology, the kind of algorithm for data compression is not important. The present technology may be applied to a case where compression error information for each pixel may be obtained corresponding to previous-frame output image data subjected to data compression/decompression processing.

The feedback ratio correction unit outputs, based on compression error information, the noise reduction processing amount calculated by the noise reduction processing amount calculator as it is or the corrected noise reduction processing amount. That is, with regard to a pixel having a noise reduction feedback ratio less than 100%, the uncorrected noise reduction processing amount calculated by the noise reduction processing amount calculator is output. Meanwhile, with regard to a pixel having a noise reduction feedback ratio of 100% or more, the noise reduction processing amount is corrected such that the feedback ratio is less than 100% and is output.

In this case, for example, the image processing apparatus may further include a frame differential calculator configured to obtain frame differential data between the previous-frame output image data and the input image data, The feedback ratio correction unit may be configured to determine whether or not a noise reduction feedback ratio is 100% or more for each pixel, based on a frame differential data calculated by the frame differential calculator, a noise reduction processing amount calculated by the noise reduction processing amount calculator, and the compression error information. The adder adds the noise reduction processing amount output from the feedback ratio correction unit to the input image data to thereby obtain output image data.

As described above, according to the present technology, it is determined whether or not a noise reduction feedback ratio is 100% or more for each pixel based on compression error information. Further, with regard to a pixel determined to have a noise reduction feedback ratio of 100% or more, the feedback ratio correction unit corrects the noise reduction processing amount calculated by the noise reduction processing amount calculator such that the feedback ratio is less than 100%, and the corrected noise reduction processing amount is used. As a result, while maintaining noise reduction effects, it is possible to avoid the state where a NR feedback ratio is 100% and an output image includes an afterimage.

Note that, in the present technology, for example, the image processing apparatus may further include a feedback ratio correction selection control unit configured to selectively output, as a noise reduction processing amount, one of a noise reduction processing amount calculated by the noise reduction processing amount calculator and a noise reduction processing amount output from the feedback ratio correction unit. The feedback ratio correction selection control unit may be configured to temporally distribute and output noise reduction processing amounts output from the feedback ratio correction unit. The adder may be configured to add a noise reduction processing amount output from the feedback ratio correction selection control unit to the input image data to thereby obtain the output image data. For example, the feedback ratio correction selection control unit is configured to output noise reduction processing amounts output from the feedback ratio correction unit with a period of predetermined lines and frames.

In this case, the feedback ratio correction selection control unit temporally distributes and outputs the noise reduction processing amounts output from the feedback ratio correction unit. As described above, with regard to a pixel determined to have a noise reduction feedback ratio of 100% or more, the noise reduction processing amount is corrected such that the feedback ratio is less than 100%. Because of the temporary feedback ratio control, a noise reduction effect weakens. However, because the control timings are distributed, viewers hardly feel the effects.

According to the present technology, it is possible to preferably avoid the state where a NR feedback ratio is 100% and an output image includes an afterimage, in a case of performing cyclic NR (noise reduction) processing by using previous-frame output image data subjected to data compression/decompression processing.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings. Note that the following items are described in this order.

1. Embodiment
2. Examples

<1. EMBODIMENT>

[Configuration Example of Image Processing Apparatus]

Figure 1:
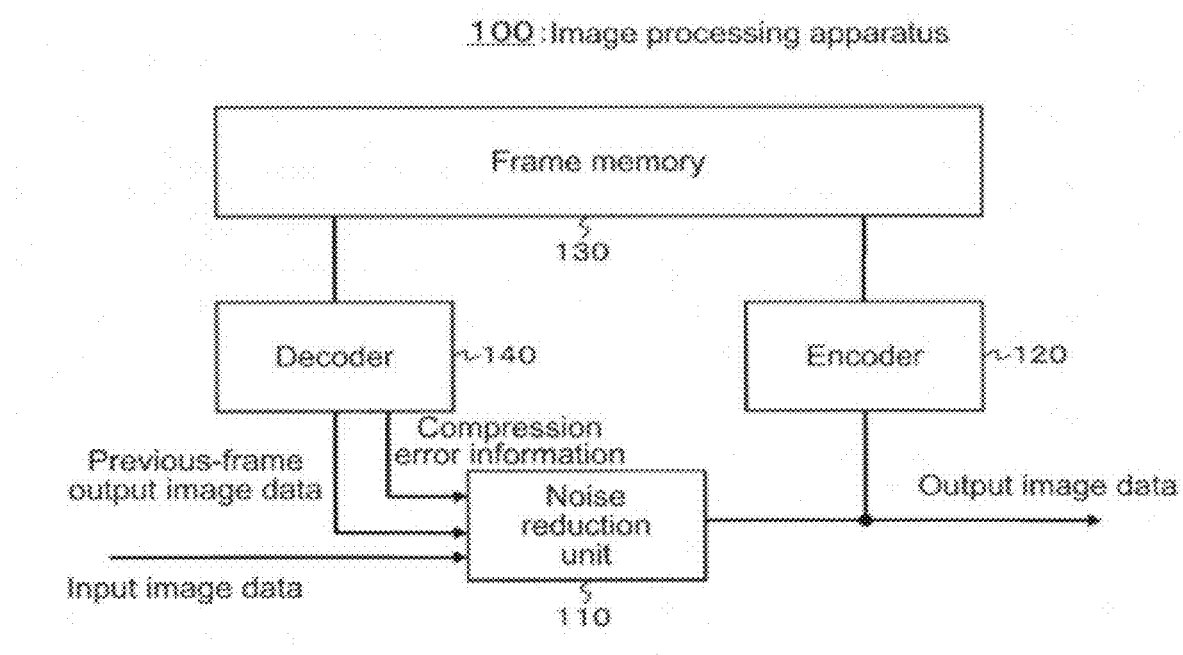
FIG. 1 is a block diagram showing a configuration example of an image processing apparatus according to an embodiment of the present technology.

FIG. 1 shows a configuration example of an image processing apparatus 100 according to an embodiment of the present technology. The image processing apparatus 100 performs cyclic NR (noise reduction) processing by using previous-frame output image data subjected to data compression/decompression processing. The image processing apparatus 100 includes a noise reduction unit 110, an encoder 120, a frame memory 130, and a decoder 140.

The encoder 120 performs invertible data compression processing with respect to output image data obtained by the noise reduction unit 110 by using a predetermined compression algorithm to thereby obtain compressed image data. The present technology is independent of a data compression algorithm. That is, in the present technology, the kind of algorithm for data compression is not important. The frame memory 130 temporarily stores the compressed image data obtained by the encoder 120. The frame memory 130 constitutes delay means of one frame.

The decoder 140 reads previous-frame compressed image data from the frame memory 130, performs data decompression processing with respect to the compressed image data, and obtains previous-frame output image data. Further, the decoder 140 outputs compression error information for each pixel corresponding to the previous-frame output image data. Independent of a data compression algorithm, the decoder 140 obtains a lost information amount because of data compression for each pixel. So when the decoder 140 decodes previous-frame output image data and outputs it, the decoder 140 is capable of outputting compression error information indicating a lost information amount for each pixel.

Based on input image data, previous-frame output image data obtained by the decoder 140, and compression error information output from the decoder 140, the noise reduction unit 110 obtains a noise reduction processing amount (NR processing amount) for each pixel. Further, the noise reduction unit 110 adds the NR processing amount to the input image data to thereby obtain output image data.

Basically, the noise reduction unit 110 calculates a NR processing amount for each pixel based on the input image data and the previous-frame output image data. The present technology is independent of a noise reduction algorithm. That is, in the present technology, the kind of algorithm for calculation of a noise reduction processing amount based on input image data and previous-frame output image data is not important.

The noise reduction unit 110 determines whether or not a noise reduction feedback ratio (NR feedback ratio) is 100% or more for each pixel based on the NR processing amount calculated as described above and the compression error information. Further, in a case where the noise reduction unit 110 determines that the NR feedback ratio of a certain pixel is 100% or more, the noise reduction unit 110 corrects the NR processing amount of the pixel such that the NR feedback ratio is less than 100%.

Further, the noise reduction unit 110 temporally distributes correction timings of the above-mentioned NR processing amount. For example, the noise reduction unit 110 corrects a NR processing amount with a period of predetermined lines and frames. A configuration example of the noise reduction unit 110 will be described later in detail.

Operations of the image processing apparatus 100 shown in FIG. 1 will be described. Output image data output from the noise reduction unit 110 is supplied to the encoder 120. The encoder 120 performs invertible data compression processing with respect to the output image data by using a predetermined compression algorithm to thereby obtain compressed image data. The compressed image data is temporarily stored in the frame memory 130.

Previous-frame compressed image data is read from the frame memory 130 and supplied to the decoder 140. The decoder 140 performs data decompression processing with respect to the compressed image data to thereby obtain previous-frame output image data. Further, the decoder 140 outputs compression error information for each pixel corresponding to previous-frame output image data. The previous-frame output image data and compression error information for each pixel corresponding to the previous-frame output image data are supplied to the noise reduction unit 110.

Input image data is further supplied to the noise reduction unit 110. The noise reduction unit 110 obtains a noise reduction processing amount (NR processing amount) for each pixel based on the input image data, the previous-frame output image data, and the compression error information for each pixel. In this case, it is determined for each pixel whether or not a NR feedback ratio is 100% or more. In a case where it is determined that the NR feedback ratio of a certain pixel is 100% or more, the NR processing amount is corrected. Further, in this case, the noise reduction unit 110 temporally distributes correction timings of the above-mentioned NR processing amount.

[Detailed Configuration Example of Noise reduction Unit]

Figure 2:
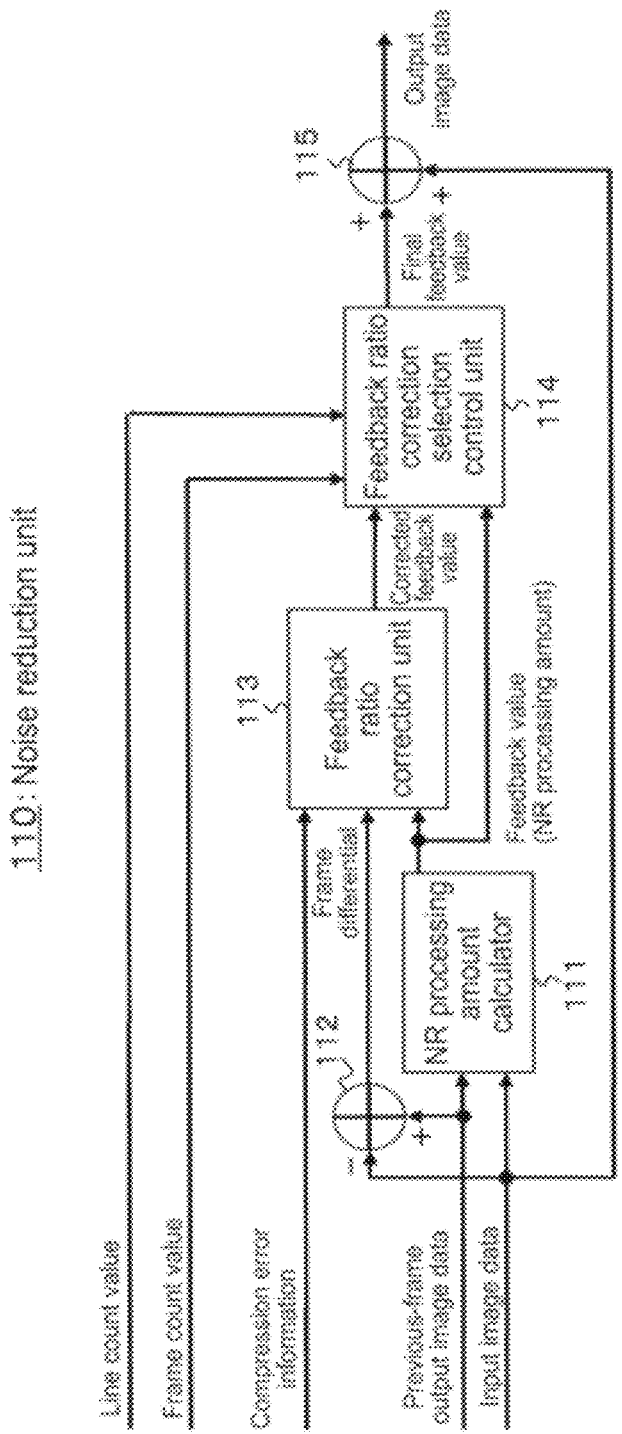
FIG. 2 is a block diagram showing a detailed configuration example of a noise reduction unit included in the image processing apparatus.

FIG. 2 shows a detailed configuration example of the noise reduction unit 110. The noise reduction unit 110 includes a noise reduction processing amount calculator 111, a subtractor 112, a feedback ratio correction unit 113, a feedback ratio correction selection control unit 114, and an adder 115.

Based on the input image data and the previous-frame output image data, the noise reduction processing amount calculator 111 calculates a noise reduction processing amount (NR processing amount) being a feedback value. Here, the previous-frame output image data is same as the data obtained by the above-mentioned decoder 140 (see FIG. 1), and is subjected to data compression/decompression processing.

Based on the input image data and the previous-frame output image data, the noise reduction processing amount calculator 111 calculates a NR processing amount (feedback value) for each pixel. As described above, the present technology is independent of a noise reduction algorithm. That is, the kind of algorithm for calculation of a NR processing amount by the noise reduction processing amount calculator 111 based on input image data and previous-frame output image data is not important.

The subtractor 112 obtains differential data between the previous-frame output image data and the input image data. That is, the subtractor 112 subtracts the input image data from the previous-frame output image data to thereby calculate differential data. The subtractor 112 constitutes a frame differential calculator.

The feedback ratio correction unit 113 corrects the NR processing amount calculated by the noise reduction processing amount calculator 111 for each pixel based on the frame differential data obtained by the subtractor 112 and compression error information, and outputs the result. Here, the compression error information is output from the above-mentioned decoder 140 (see FIG. 1) corresponding to the previous-frame output image data.

The feedback ratio correction unit 113 determines for each pixel whether or not the noise reduction feedback ratio (NR feedback ratio) is 100% or more. Further, in a case where it is determined that a NR feedback ratio of a certain pixel is less than 100%, the feedback ratio correction unit 113 outputs the uncorrected NR processing amount calculated by the noise reduction processing amount calculator 111 as it is. Further, in a case where it is determined that a NR feedback ratio of a certain pixel is 100% or more, the feedback ratio correction unit 113 corrects the NR processing amount calculated by the noise reduction processing amount calculator 111 such that the NR feedback ratio is less than 100%, and outputs the result.

Figure 3:
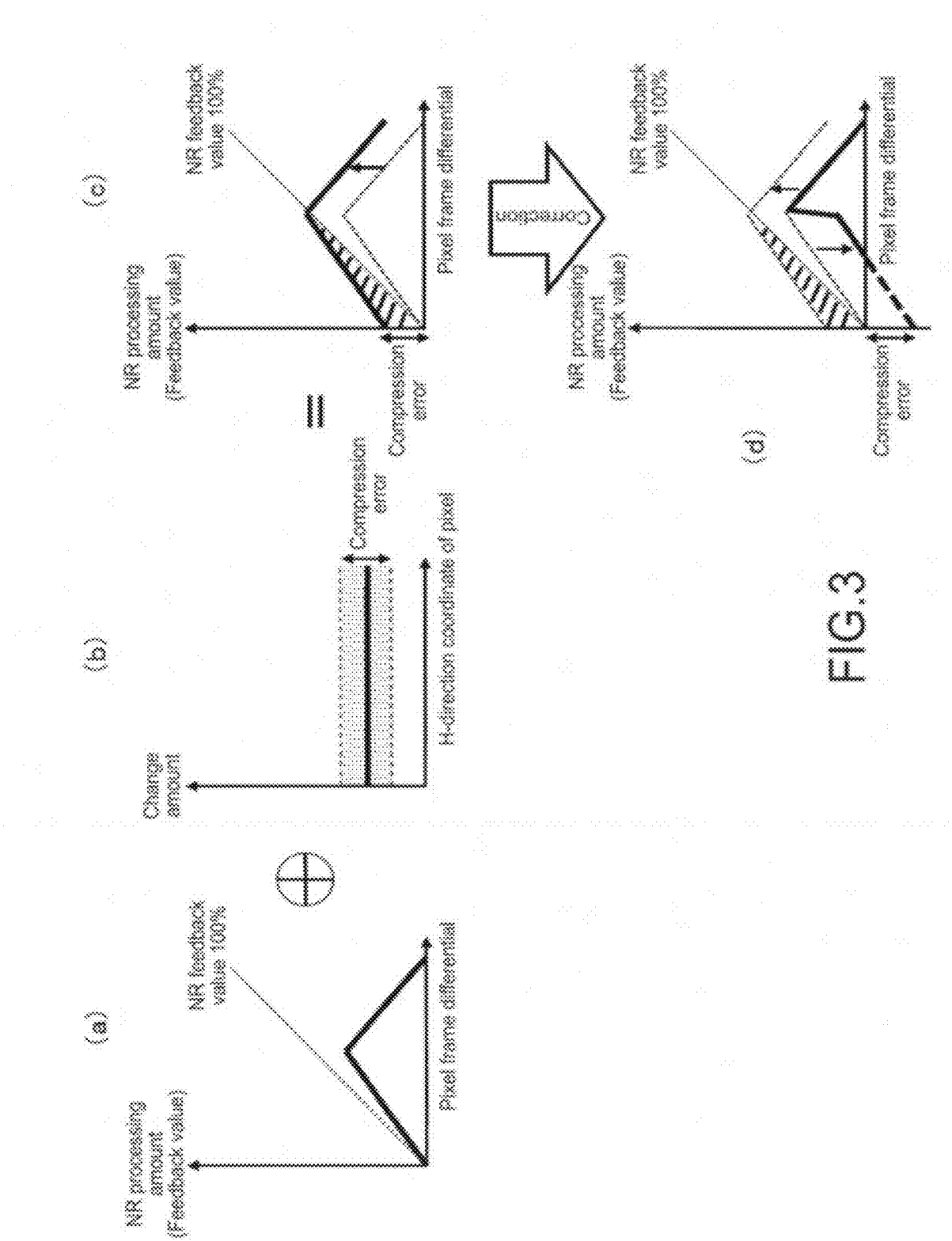
FIG. 3 is a diagram conceptually showing correction processing of a NR processing amount (feedback value) of a feedback ratio correction unit included in the noise reduction unit.
Figure 4:
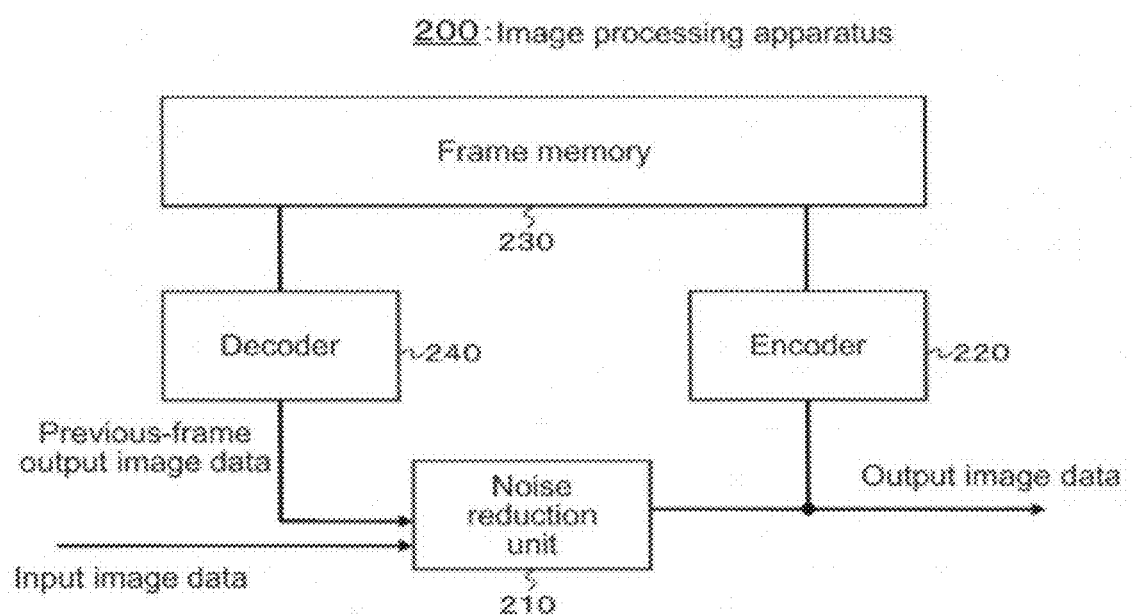
FIG. 4 is a block diagram showing an example of an image processing apparatus performing cyclic noise reduction processing.
Figure 5:
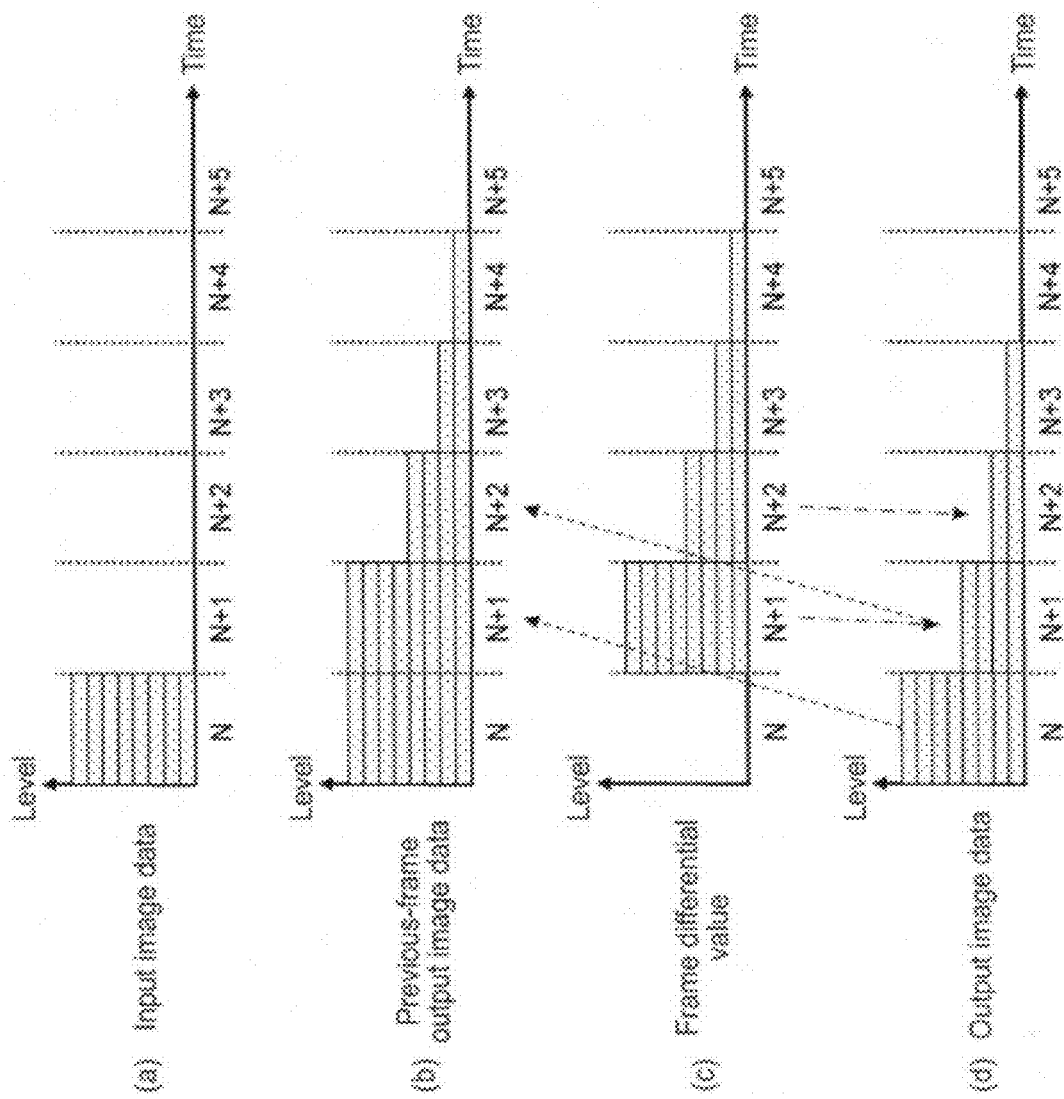
FIG. 5 is a diagram showing examples of image data of the respective units of an image processing apparatus performing cyclic noise reduction processing in a case where data compression processing is not combined.
Figure 6:
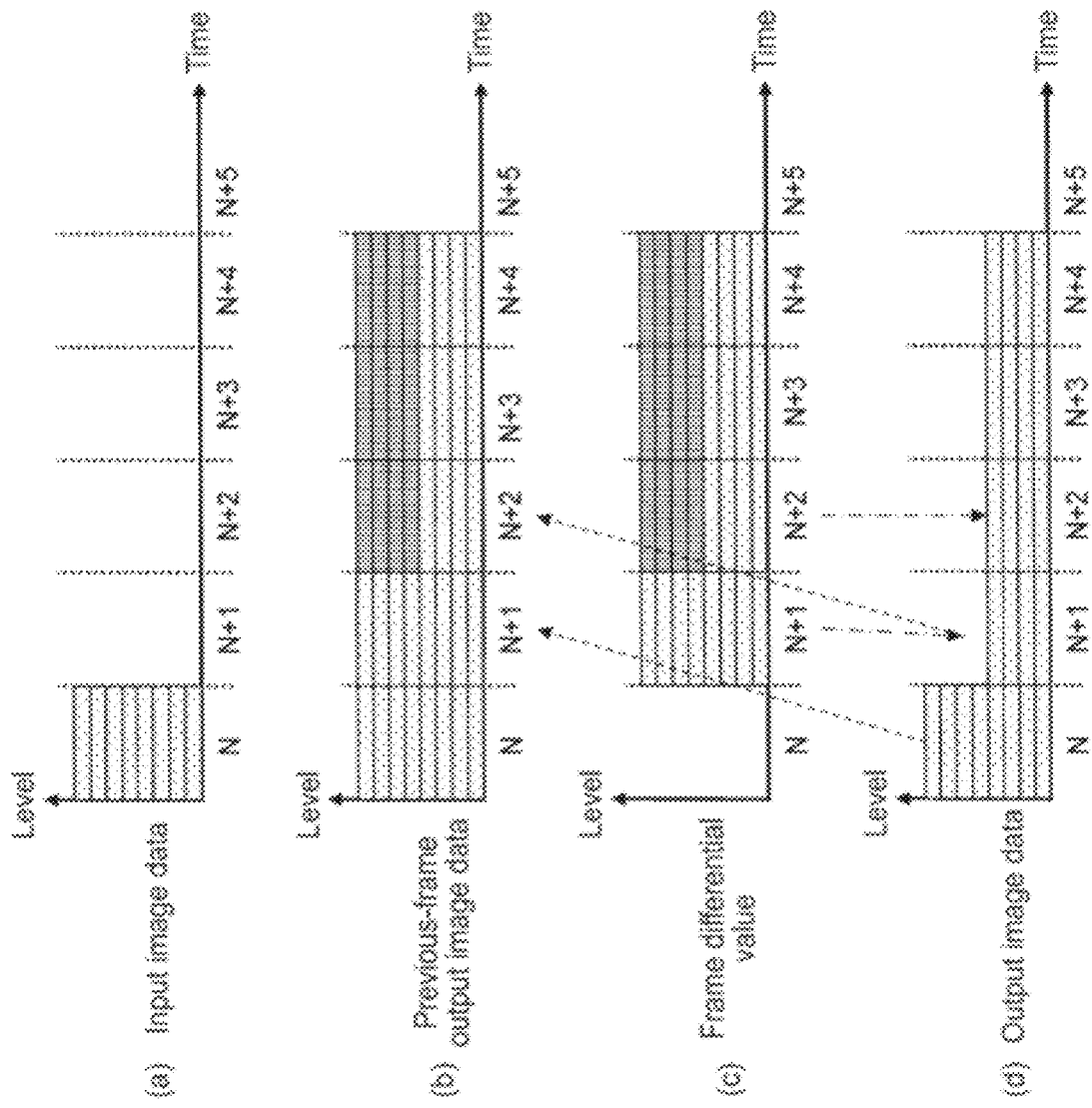
FIG. 6 is a diagram showing examples of image data of the respective units of an image processing apparatus performing cyclic noise reduction processing in a case where data compression processing is combined.
Figure 7:
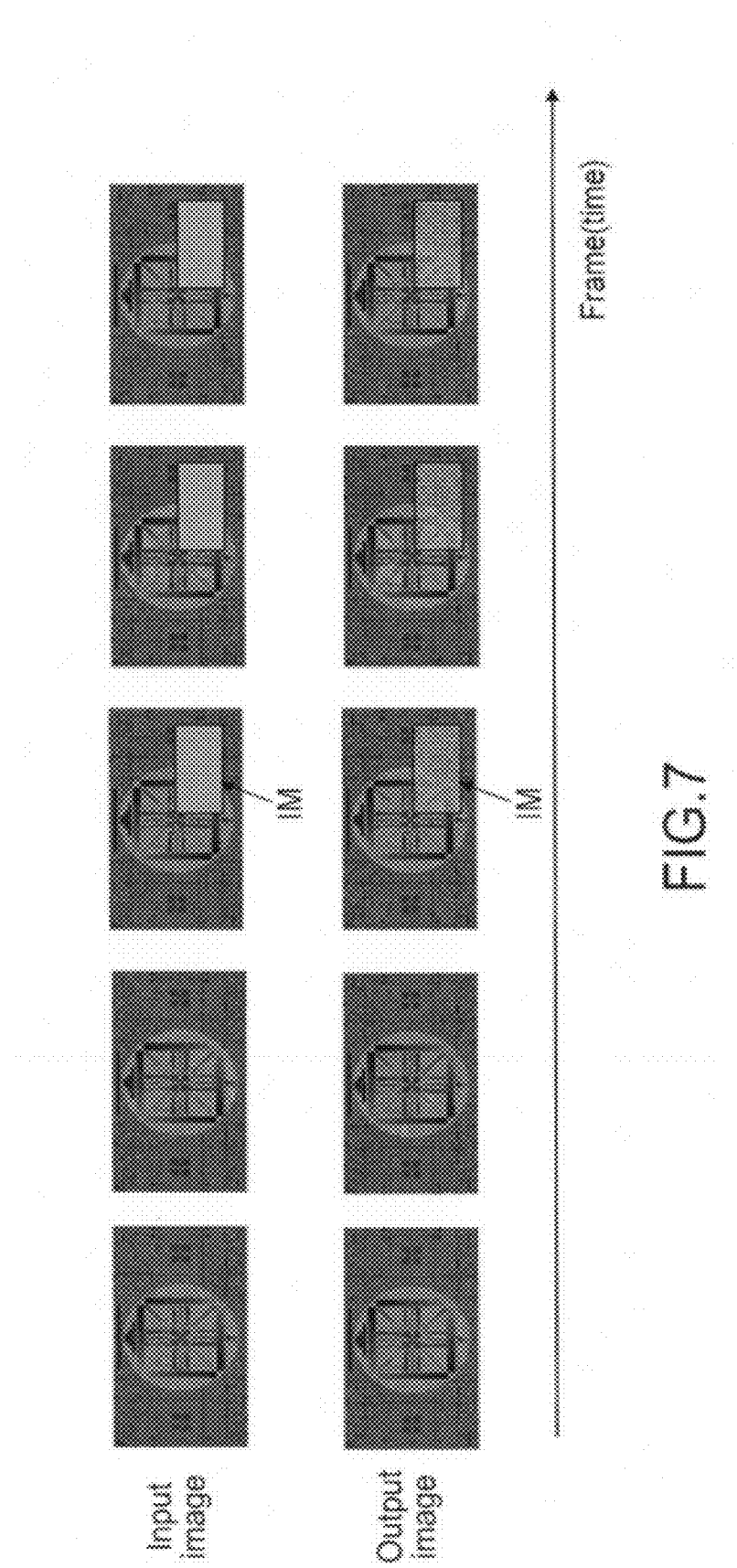
FIG. 7 is a diagram showing examples of images of input image data (input images) and images of output image data (output images).

FIG. 3 conceptually shows a NR processing amount (feedback value) correct processing by the feedback ratio correction unit 113. (a) in FIG. 3 shows an example of a correspondence relation between a NR processing amount calculated by the noise reduction processing amount calculator 111, and frame differential data between previous-frame output image data and input image data. In this case, the NR processing amount is calculated such that a NR feedback ratio is less than 100%.

(b) in FIG. 3 shows, for example, assuming a case where the same compression error occurs in the respective pixels in a frame because of the data compression/decompression processing, a compression error range in the respective pixels arranged in the horizontal direction. Note that, here, for ease of explanation, a case where the same compression error occurs in the respective pixels in a frame will be assumed and described. However, in fact, it is not always true that the same compression error occurs in the respective pixels in a frame.

As described above, as shown in (a) in FIG. 3, the noise reduction processing amount calculator 111 calculates a NR processing amount such that the NR feedback ratio is less than 100%. However, assuming a compression error shown in (b) in FIG. 3, the NR feedback ratio may be 100% or more as shown in the hatched area in (c) in FIG. 3, according to frame differential data levels.

Therefore, as shown in (d) in FIG. 3, in a case where it is determined that a pixel has a NR feedback ratio of 100% or more, the feedback ratio correction unit 113 corrects the NR processing amount calculated by the noise reduction processing amount calculator 111 such that the NR feedback ratio is less than 100%, and outputs the corrected NR processing amount. Note that, in a case where it is determined that a pixel has a NR feedback ratio less than 100% considering compression errors, for example, a pixel having a high frame differential data level, the feedback ratio correction unit 113 does not correct the NR processing amount calculated by the noise reduction processing amount calculator 111, and outputs the NR processing amount as it is.

With reference to FIG. 2 again, the feedback ratio correction selection control unit 114 selectively outputs the noise reduction processing amount calculated by the noise reduction processing amount calculator 111 or the noise reduction processing amount output from the feedback ratio correction unit 113 as a NR processing amount (feedback value). In this case, the feedback ratio correction selection control unit 114 temporally distributes and outputs the noise reduction processing amounts output from the feedback ratio correction unit 113.

In this embodiment, the feedback ratio correction selection control unit 114 outputs the noise reduction processing amount output from the feedback ratio correction unit 113 with a period of predetermined lines and frames, based on a line count value and a frame count value. As a result, for example, the feedback ratio correction unit 113 and the feedback ratio correction selection control unit 114 perform corrections at the following timing. Note that numerical values such as "30" and "4" are merely examples.

(1) Frames in multiples of 30: To correct pixels only having feedback ratios of 100% or more on lines in multiples of 4

(2) Frames in multiples of 30, plus 1: To correct pixels only having feedback ratios of 100% or more on lines in multiples of 4, plus 1

(3) Frames in multiples of 30, plus 2: To correct pixels only having feedback ratios of 100% or more on lines in multiples of 4, plus 2

(4) Frames in multiples of 30, plus 3: To correct pixels only having feedback ratios of 100% or more on lines in multiples of 4, plus 3

The adder 115 adds the final NR processing amount (final feedback value) output from the feedback ratio correction selection control unit 114 to the input image data to thereby obtain output image data.

Operations of the noise reduction unit 110 shown in FIG. 2 will be described. Input image data and previous-frame output image data subjected to data compression/decompression processing are supplied to the noise reduction processing amount calculator 111. The noise reduction processing amount calculator 111 calculates a noise reduction processing amount (NR processing amount) as a feedback value based on the input image data and the previous-frame output image data. The NR processing amount is supplied to the feedback ratio correction unit 113.

Further, the input image data and the previous-frame output image data are supplied to the subtractor 112. The subtractor 112 subtracts the input image data from the previous-frame output image data to thereby obtain frame differential data. The frame differential data is supplied to the feedback ratio correction unit 113. Further, compression error information for each pixel corresponding to the previous-frame output image data is supplied to the feedback ratio correction unit 113.

The feedback ratio correction unit 113 corrects the NR processing amount calculated by the noise reduction processing amount calculator 111 for each pixel based on the frame differential data and the compression error information, and outputs the corrected NR processing amount. In this case, the feedback ratio correction unit 113 compares the NR processing amount calculated by the noise reduction processing amount calculator 111 to the frame differential data for each pixel, and determines whether or not the NR feedback ratio is 100% or more considering compression errors.

Further, in a case where it is determined that a pixel has a NR feedback ratio less than 100%, the feedback ratio correction unit 113 does not correct the NR processing amount calculated by the noise reduction processing amount calculator 111, and outputs the NR processing amount as it is. Further, in a case where it is determined that a pixel has a NR feedback ratio of 100% or more, the feedback ratio correction unit 113 corrects the NR processing amount calculated by the noise reduction processing amount calculator 111 such that the NR feedback ratio is less than 100%, and outputs the corrected NR processing amount.

The corrected NR processing amount (corrected feedback value) output from the feedback ratio correction unit 113 is supplied to the feedback ratio correction selection control unit 114. Further, the NR processing amount calculated by the noise reduction processing amount calculator 111 is supplied to the feedback ratio correction selection control unit 114. Further, a line count value and a frame count value are supplied to the feedback ratio correction selection control unit 114.

The feedback ratio correction selection control unit 114 selectively outputs the NR processing amount calculated by the noise reduction processing amount calculator 111 or the NR processing amount output from the feedback ratio correction unit 113 as a NR processing amount. In this case, the feedback ratio correction selection control unit 114 outputs, for example, the NR processing amount output from the feedback ratio correction unit 113 with a period of predetermined lines and frames. As a result, the NR processing amounts output from the feedback ratio correction unit 113 are temporally distributed and output.

The final NR processing amount (final feedback value) output from the feedback ratio correction selection control unit 114 is supplied to the adder 115. Further, the input image data is supplied to the adder 115. The adder 115 adds the final NR processing amount output from the feedback ratio correction selection control unit 114 to the input image data to thereby obtain output image data.

As described above, in the image processing apparatus 100 shown in FIG. 1, the noise reduction unit 110 determines whether or not the noise reduction feedback ratio is 100% or more for each pixel based on the compression error information. Further, in a case where it is determined that a pixel has a NR feedback ratio of 100% or more, the feedback ratio correction unit 113 corrects the NR processing amount (feedback value) calculated by the noise reduction processing amount calculator 111 such that the feedback ratio is less than 100%, and the corrected NR processing amount (feedback value) is used. As a result, while maintaining noise reduction effects, it is possible to avoid the state where a NR feedback ratio is 100% and an output image includes an afterimage.

Further, in the image processing apparatus 100 shown in FIG. 1, in the noise reduction unit 110, the feedback ratio correction selection control unit 114 temporally distributes and outputs the NR processing amounts (corrected feedback values) output from the feedback ratio correction unit 113. In a case where it is determined that a pixel has a NR feedback ratio of 100% or more, the feedback ratio correction unit 113 corrects the NR processing amount such that the feedback ratio is less than 100%. Because of the temporary feedback ratio control, the noise reduction effect weakens. However, because the control timings are distributed, viewers hardly feel the effects.

Further, the image processing apparatus 100 shown in FIG. 1 is independent of data compression and noise reduction algorithms. As a result, in a case where a data compression or noise reduction function is updated or replaced, similar effects may be obtained without modifying circuits, programs, and the like.

2. EXAMPLES

Note that, in the above-mentioned embodiment, the noise reduction unit 110 includes the feedback ratio correction selection control unit 114. However, in the present technology, the feedback ratio correction selection control unit 114 is not indispensable. That is, as the noise reduction unit 110, there is definitely a possibility that the noise reduction unit 110 shown in FIG. 2 excludes the feedback ratio correction selection control unit 114. In this case, the corrected NR processing amount (corrected feedback value) output from the feedback ratio correction unit 113 is directly input to the adder 115.

Further, in the above-mentioned embodiment, the noise reduction processing by the image processing apparatus 100 may be executed by using hardware or software. In a case of executing the processing by using software, programs in which processing sequences are recorded are installed in a memory of a computer mounted in dedicated hardware and, are executed. Alternatively, programs may be installed in a general-purpose computer capable of executing various kinds of processing, and may be executed. In this case, programs cause a computer to function as the respective functional blocks in the image processing apparatus 100.

Further, the present technology may employ the following configurations.

(1) An image processing apparatus, comprising:
  a noise reduction processing amount calculator configured to calculate a noise reduction processing amount based on input image data and previous-frame output image data subjected to data compression/decompression processing;
  a feedback ratio correction unit configured, based on compression error information,
    to output the uncorrected noise reduction processing amount calculated by the noise reduction processing amount calculator with regard to a pixel having a noise reduction feedback ratio less than 100%, and
    to correct the noise reduction processing amount with regard to a pixel having a noise reduction feedback ratio of 100% or more such that the feedback ratio is less than 100%, and to output the corrected noise reduction processing amount; and
  an adder configured to add the noise reduction processing amount output from the feedback ratio correction unit to the input image data to thereby obtain output image data.

(2) The image processing apparatus according to (1), further comprising:
  a frame differential calculator configured to obtain frame differential data between the previous-frame output image data and the input image data, wherein
  the feedback ratio correction unit is configured to determine whether or not a noise reduction feedback ratio is 100% or more for each pixel, based on a frame differential data calculated by the frame differential calculator, a noise reduction processing amount calculated by the noise reduction processing amount calculator, and the compression error information.

(3) The image processing apparatus according to (1) or (2), further comprising:
  a feedback ratio correction selection control unit configured to selectively output, as a noise reduction processing amount, one of a noise reduction processing amount calculated by the noise reduction processing amount calculator and a noise reduction processing amount output from the feedback ratio correction unit, wherein the feedback ratio correction selection control unit is configured to temporally distribute and output noise reduction processing amounts output from the feedback ratio correction unit, and the adder is configured to add a noise reduction processing amount output from the feedback ratio correction selection control unit to the input image data to thereby obtain the output image data.

(4) The image processing apparatus according to (3), wherein the feedback ratio correction selection control unit is configured to output noise reduction processing amounts output from the feedback ratio correction unit with a period of predetermined lines and frames.

(5) An image processing method, comprising:

calculating a noise reduction processing amount based on input image data and previous-frame output image data subjected to data compression/decompression processing;

outputting, based on compression error information, the uncorrected noise reduction processing amount calculated by the noise reduction processing amount calculator with regard to a pixel having a noise reduction feedback ratio less than 100%, and correcting the noise reduction processing amount with regard to a pixel having a noise reduction feedback ratio of 100% or more such that the feedback ratio is less than 100% and outputting the corrected noise reduction processing amount; and adding the noise reduction processing amount output from the feedback ratio correction unit to the input image data to thereby obtain output image data.

(6) An image processing apparatus, comprising:

a encoder configured to perform data compression processing of output image data, and to write compressed image data in a memory;

a decoder configured to read previous-frame compressed image data from the memory, to perform data decompression processing, and to output compression error information for each previous-frame output image data and for each pixel;

a noise reduction processing amount calculator configured to calculate a noise reduction processing amount based on input image data and previous-frame output image data output from the decoder;

a feedback ratio correction unit configured, based on the compression error information output from the decoder, to output the uncorrected noise reduction processing amount calculated by the noise reduction processing amount calculator with regard to a pixel having a noise reduction feedback ratio less than 100%, and to correct the noise reduction processing amount with regard to a pixel having a noise reduction feedback ratio of 100% or more such that the feedback ratio is less than 100%, and to output the corrected noise reduction processing amount; and an adder configured to add the noise reduction processing amount output from the feedback ratio correction unit to the input image data to thereby obtain output image data.

The present disclosure contains subject matter related to that disclosed in Japanese Priority Patent Application JP 2011-126040 filed in the Japan Patent Office on Jun. 6, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:

circuitry configured to act as:

a noise reduction processing amount calculator configured to calculate a noise reduction processing amount based on input image data and previous-frame output image data subjected to data compression/decompression processing;

a feedback ratio correction configured, based on compression error information, to output the uncorrected noise reduction processing amount calculated by the noise reduction processing amount calculator with regard to a pixel having a noise reduction feedback ratio less than 100%, and to correct the noise reduction processing amount with regard to a pixel having a noise reduction feedback ratio of 100% or more such that the feedback ratio is less than 100%, and to output the corrected noise reduction processing amount; and an adder configured to add the noise reduction processing amount output from the feedback ratio correction unit to the input image data to thereby obtain output image data.

2. The image processing apparatus according to claim 1, wherein the circuitry is further configured to act as:

a frame differential calculator configured to obtain frame differential data between the previous-frame output image data and the input image data, and the feedback ratio correction unit is configured to determine whether or not a noise reduction feedback ratio is 100% or more for each pixel, based on a frame differential data calculated by the frame differential calculator, a noise reduction processing amount calculated by the noise reduction processing amount calculator, and the compression error information.

3. The image processing apparatus according to claim 1, wherein the circuitry is further configured to act as:

a feedback ratio correction selection control unit configured to selectively output, as a noise reduction processing amount, one of a noise reduction processing amount calculated by the noise reduction processing amount calculator and a noise reduction processing amount output from the feedback ratio correction unit, the feedback ratio correction selection control unit is configured to temporally distribute and output noise reduction processing amounts output from the feedback ratio correction unit, and the adder is configured to add a noise reduction processing amount output from the feedback ratio correction selection control unit to the input image data to thereby obtain the output image data.

4. The image processing apparatus according to claim 3, wherein the feedback ratio correction selection control unit is configured to output noise reduction processing amounts output from the feedback ratio correction unit with a period of predetermined lines and frames.

5. An image processing method, comprising:

calculating, by processing circuitry, a noise reduction processing amount based on input image data and previous-frame output image data subjected to data compression/decompression processing;

outputting, based on compression error information, the uncorrected noise reduction processing amount calculated by the noise reduction processing amount calculator with regard to a pixel having a noise reduction feedback ratio less than 100%, and correcting the noise reduction processing amount with regard to a pixel having a noise reduction feedback ratio of 100% or more such that the feedback ratio is less than 100% and outputting the corrected noise reduction processing amount; and adding, by the processing circuitry, the noise reduction processing amount output from the feedback ratio correction unit to the input image data to thereby obtain output image data.

6. An image processing apparatus, comprising:

circuitry configured to act as:

an encoder configured to perform data compression processing of output image data, and to write compressed image data in a memory;

a decoder configured to read previous-frame compressed image data from the memory, to perform data decompression processing, and to output compression error information for each previous-frame output image data and for each pixel;

a noise reduction processing amount calculator configured to calculate a noise reduction processing amount based on input image data and previous-frame output image data output from the decoder;

a feedback ratio correction unit configured, based on the compression error information output from the decoder, to output the uncorrected noise reduction processing amount calculated by the noise reduction processing amount calculator with regard to a pixel having a noise reduction feedback ratio less than 100%, and to correct the noise reduction processing amount with regard to a pixel having a noise reduction feedback ratio of 100% or more such that the feedback ratio is less than 100%, and to output the corrected noise reduction processing amount; and an adder configured to add the noise reduction processing amount output from the feedback ratio correction unit to the input image data to thereby obtain output image data.

* * * * *